US007712099B2

(12) United States Patent
Vargas et al.

(10) Patent No.: US 7,712,099 B2
(45) Date of Patent: May 4, 2010

(54) METHOD AND APPARATUS FOR SYNCHRONIZATION OF PERIODIC PROCESSES

(75) Inventors: Garrett R. Vargas, Kirkland, WA (US); Scott R. Shell, Redmond, WA (US); Matthew W. Taylor, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 1052 days.

(21) Appl. No.: 10/978,481

(22) Filed: Nov. 2, 2004

(65) Prior Publication Data

US 2005/0132372 A1 Jun. 16, 2005

Related U.S. Application Data

(63) Continuation of application No. 09/784,095, filed on Feb. 16, 2001, now Pat. No. 6,918,115.

(51) Int. Cl.
*G06F 9/46* (2006.01)
(52) U.S. Cl. .......................... 718/102; 718/107; 714/2
(58) Field of Classification Search .......... 718/100–108
See application file for complete search history.

(56) References Cited

U.S. PATENT DOCUMENTS

| 5,491,791 | A | * | 2/1996 | Glowny et al. ................. 714/37 |
| 5,606,695 | A | * | 2/1997 | Dworzecki ..................... 705/8 |
| 5,933,655 | A | | 8/1999 | Vrabec et al. |
| 5,944,778 | A | | 8/1999 | Takeuchi et al. |
| 6,016,500 | A | * | 1/2000 | Waldo et al. ................. 707/202 |
| 6,189,022 | B1 | | 2/2001 | Binns |
| 6,243,735 | B1 | | 6/2001 | Imanishi et al. |
| 6,272,074 | B1 | * | 8/2001 | Winner ........................ 368/10 |
| 6,567,840 | B1 | | 5/2003 | Binns et al. |
| 6,594,774 | B1 | * | 7/2003 | Chapman et al. ................ 714/2 |
| 6,732,359 | B1 | * | 5/2004 | Kirkpatrick et al. .......... 718/102 |
| 6,970,878 | B1 | * | 11/2005 | Butcher ....................... 707/102 |
| 6,990,668 | B1 | * | 1/2006 | Miller et al. ................. 718/106 |
| 6,996,884 | B2 | * | 2/2006 | Aratake et al. ............. 29/25.35 |
| 7,100,162 | B2 | * | 8/2006 | Green et al. ................. 718/102 |
| 7,225,361 | B2 | * | 5/2007 | Cobb et al. .................... 714/38 |
| 7,327,780 | B2 | * | 2/2008 | Oates et al. ................. 375/150 |
| 2002/0152446 | A1 | * | 10/2002 | Fleming ..................... 714/815 |

(Continued)

OTHER PUBLICATIONS

Lin et al., "Scheduling Periodic and Aperiodic Tasks in Hard Real-Time Computing Systems", ACM 1991, pp. 31-38.*

(Continued)

*Primary Examiner*—Lewis A Bullock, Jr.
*Assistant Examiner*—Jue Wang
(74) *Attorney, Agent, or Firm*—Merchant & Gould

(57) ABSTRACT

A system and method is disclosed for synchronizing certain periodic activities and/or processes in a computer system or device. The synchronization allows more efficient use of the computer system's or device's processing capabilities, and may result in conservation of electrical power. In one example embodiment, a periodic scheduler is implemented to periodically verify the continued existence of critical processes operating in the computer system or device. Corrective, or other appropriate, action may be taken in the event of a failure of a critical process. A schedule list, which may be a linked list, may be used to track the periodic processes that are to occur. Upon registration of a critical process, the schedule list may be modified to synchronize the new periodic process with the existing schedule list.

13 Claims, 8 Drawing Sheets

U.S. PATENT DOCUMENTS

2007/0057051 A1* 3/2007 Bortolin et al. ............. 235/383
2007/0174479 A1* 7/2007 Sperry et al. ................ 709/233

OTHER PUBLICATIONS

Tsung-Yi Wu, Tzu-Chie Tien, Allen C.-H. Wi), Youn-Long Lin, a Synthesis Method for Mixed Synchronous/Asychronous Behavior, article, European Design and Test Conference, Paris France, Feb. 28-Mar. 3, 1994, pp. 277-281.

Thomas S. Anantharaman, Edmund M. Clarke, Michael J. Foster Oot, Compiling Path Expressions into VLSI Circuits, abstract Computer Science Department, School of Computer Science, Carnegie Mellon University, Aug. 1984.

Joachim Wegener, Harmen Sti-Iamer, Bryan F. Jones and David E. Eyres, article, Software Quality Journal 6, (1997) pp. 127-135, 2000.

Little, T.D.C.; Ghafoor, A.; Chen C.Y.R., Conceptual Data models for Time-Dependent Multimedia Data, abstract, Institution of Electrical Engineers, 1992 Arizona State University, Tempe, AZ.

Little, T.D.C.; Ghafoor, A; Chen C.Y.R., Interval-Based Conceptual Data Models for Time-Dependent Multimedia Data, paper, School of Electrical Engineering, Purdue University, West Lafayette, IN 47907, MCI Technical Report May 07, 1993, pp. 1-35.

Richard Gerber, Insup Lee, CCSR: A Calculus for Communicating Shared Resources, paper, Dept. of Computer and Information Science, University of Pennsylvania, Aug. 27-30, 1990, pp. 263-77.

A. Pogany, Concurrency Control in Distributed Databases, A Timing Based Algorithm, article, Alkalmazott Matematlkal Lapok 7, vol. 7, N. 3-4. 1981, pp. 311-329.

An Event Trace Monitor for the Vax 11/780, Stephen Tolooks, Computer Science Department, Lafayette, Indiana 47907, 1981.

Scheduling Algorithms for Multiprogramming in the Hard Real-Time Environment. C.L. Liu and James W. Layland, Journal of the Association for computing Machinary, vol. 20, No. 1, Jan. 1973.

Scheduling Periodic and Aperiodic Tasks in Hard Real-Time Computing Systems, Tein-Hsiang Lin and Wemhuar Targ, Department of Electrical and Computer Science and Computer Engineering, Buffallo New York, 1991.

* cited by examiner

METHOD AND APPARATUS FOR SYNCHRONIZATION OF PERIODIC PROCESSES

CROSS-REFERENCE OF RELATED APPLICATION

This application is a continuation of application Ser. No. 09/784,095, filed Feb. 16, 2001 now U.S. Pat. No. 6,918,115.

TECHNICAL FIELD

Aspects of the present invention relate generally to computer systems and processes. A further aspect of the present invention relates to the use of a schedule of periodic processes. A further aspect of the present invention relates to conserving computer resources, such as electrical power, by synchronizing periodic processes.

BACKGROUND OF THE INVENTION

Computing systems commonly include one or more processors that execute one or more processes, or sequences of instructions, during the operation of the computer. For example, a computer might have a process for monitoring the system time, a process for displaying particular graphics, a process for responding to user input, etc. Some systems also include processes that monitor the continued existence of other important processes, and may be programmed to take appropriate action if a critical or important process should fail.

These various processes commonly require some form of periodic activity. For example, a process for displaying the current time onscreen may require an update of its display once every minute. A cellular telephone might need to check its signal strength once every second. A process monitor may need to periodically verify the existence of one or more critical processes, with each check potentially occurring at a different frequency (e.g., once every 500 ms, once every minute, etc.).

As more and more periodic processes occur, the processing activity within such a system becomes erratic. To illustrate, FIG. 5a illustrates an exemplary graph of processing activity of a conventional system in which periodic processes occur. In FIG. 5a, Processes A and B begin their periodic activity at time t=0 seconds, with Process A occurring every 4 seconds, and Process B occurring every 5 seconds (its period). Process C is shown as first occurring at time t=1.3 seconds, with a period of 2 seconds. The top three graphs in FIG. 5a illustrate the individual schedules for these periodic processes, while the fourth graph in FIG. 5a shows the combined effect of these processes. As shown in FIG. 5a, the net effect of these periodic processes is a large number of brief activity separated by numerous periods of inactivity.

Such processing activity is particularly undesirable for systems that attempt to use low power consumption modes to conserve power when not in use. In such low-power modes, for example, a computer system might deactivate a particular hardware device if a certain amount of time (e.g., 2 minutes) passes without its use. Power is conserved when the device is deactivated, but additional overhead processing and power are required to manage the activation/deactivation of these devices. As another example, the system might place one or more memories (e.g., RAM or ROM) in a self-refresh mode. As with deactivation of a hardware device, entering and exiting this self-refresh mode requires overhead processing and power. Consequently, the low power consumption modes are most efficient when periods of activity are consolidated to minimize the number of times they enter and exit their conservation modes.

Such low power consumption modes are less effective, however, in systems having the periodic processes as shown in FIG. 5a due to the many periods of activity and periods of inactivity. Accordingly, there is a need for an improved method and system of handling periodic activity to increase the effectiveness of such low power consumption modes.

Such an improvement would be particularly welcome in systems that employ process monitoring, as such activity commonly requires a large number of periodic processes. Process monitoring often requires that certain processes, deemed important or critical to the system, be checked periodically to verify that they remain in existence. Different computer systems may have different levels of criticality, but one example of a critical process might be a process that is in charge of updating a portion of memory. If such a critical process should ever fail, the operation of the computer might be jeopardized. Other processes might be less critical, and might not generate a serious error if failed (for example, a process for updating a graphical icon might not be considered critical). The periodic monitoring of such critical processes may be accomplished by a critical process monitor (CPM), which serves to detect the failure of a critical process, and may then take corrective action to address the failure.

For example, in one CPM implemented in the "AUTOPC" computer platform developed by Microsoft Corp., the CPM functionality is implemented as two distinct system calls: CPMRegister and CPMNotify. System calls generally include functions and/or processes that can be executed by another function and/or process.

The CPM monitors processes that have registered with the CPM, and accordingly, a critical process typically first registers with the CPM by executing the CPMRegister function or system call. In this call, the critical process provides the CPM with a time period (e.g., 4 seconds) that indicates how frequently the critical process wants to be checked to make sure it remains active. Once registered, it is the critical process' responsibility to call CPMNotify at least once every period (e.g., once every 4 seconds) to inform the CPM that the critical process remains active. If the critical process should ever fail to provide this notification through an entire period, then the CPM may take corrective action, such as restarting the critical process.

This periodic notification allows the CPM to monitor the continued existence of critical processes, improving reliability of the overall system, but it also introduces a number of additional timers to the system. Each critical process requires one or more timer processes to keep track of the amount of time passed since its last call to CPMNotify, and to determine whether another call to CPMNotify is needed. These timers require additional processing and power from the computing system. The increase in power usage is particularly disadvantageous for computing devices that have a limited power supply, such as a cellular telephone, a pager, or a personal digital assistant (PDA). Heretofore, this increased power usage was simply accepted as a necessary part of having the CPM.

All of the problems discussed above increase the power and processing required by a computing system, and can reduce the operational life of the system when the system relies on a limited power supply, such as batteries in a cellular telephone. This reduced operational life is undesirable, and there is a present need for a system that retains the functionality provided by processes and periodic processes, but also reduces the processing and electrical power required by such a system.

SUMMARY OF THE INVENTION

A novel system is provided that reduces the power consumption in computing devices through the introduction of a periodic scheduler. Such a scheduler may be used, for example, by a critical process monitor to efficiently monitor a number of processes. Aspects include a scheduling system that records existing scheduled periodic activities, and receives new requests to schedule periodic activities.

Further aspects include using a stored schedule list to carry out periodic actions, events, or processes. The schedule list may contain one or more time values, may be a linked list, and may be circular in nature. Further aspects of the schedule list may also include one or more event identifiers to identify the particular periodic event that is to occur.

Further aspects also include comparing a received new request for a new periodic event with an existing schedule to determine whether the new periodic event can occur at the same time as one or more existing scheduled periodic activities. Another aspect involves modifying a stored schedule list to add one or more new entries for the new periodic event. Further aspects include adding additional entries to the schedule list such that the last entry in the list is a common multiple of periods for periodic events in the schedule list.

Another aspect includes a system call that allows certain processes to specify a range of period times when registering a periodic event. A further aspect allows a process to specify a range of times for the periodic event in which one or more time values are permitted to vary, and may include wildcard values (e.g., "don't care" values).

Another further aspect includes a centralized timer function for initiating a process monitor, which in turn may monitor one or more periodic events to ensure that they occur.

In further aspects, portions of a computer system are permitted to enter low-power consumption modes for greater periods of time, allowing increased power efficiency.

A further aspect includes a critical process monitor that may periodically monitor the continued existence of registered critical processes, and take corrective action in the event that a critical process has failed.

A further aspect includes registering all processes that need to be woken up periodically with the process synchronizer, allowing it to synchronize timers associated with the registered processes.

Additional aspects will become apparent to one skilled in the art in view of the following descriptions of the figures and embodiments.

DETAILED DESCRIPTION OF THE INVENTION

Figure 1:
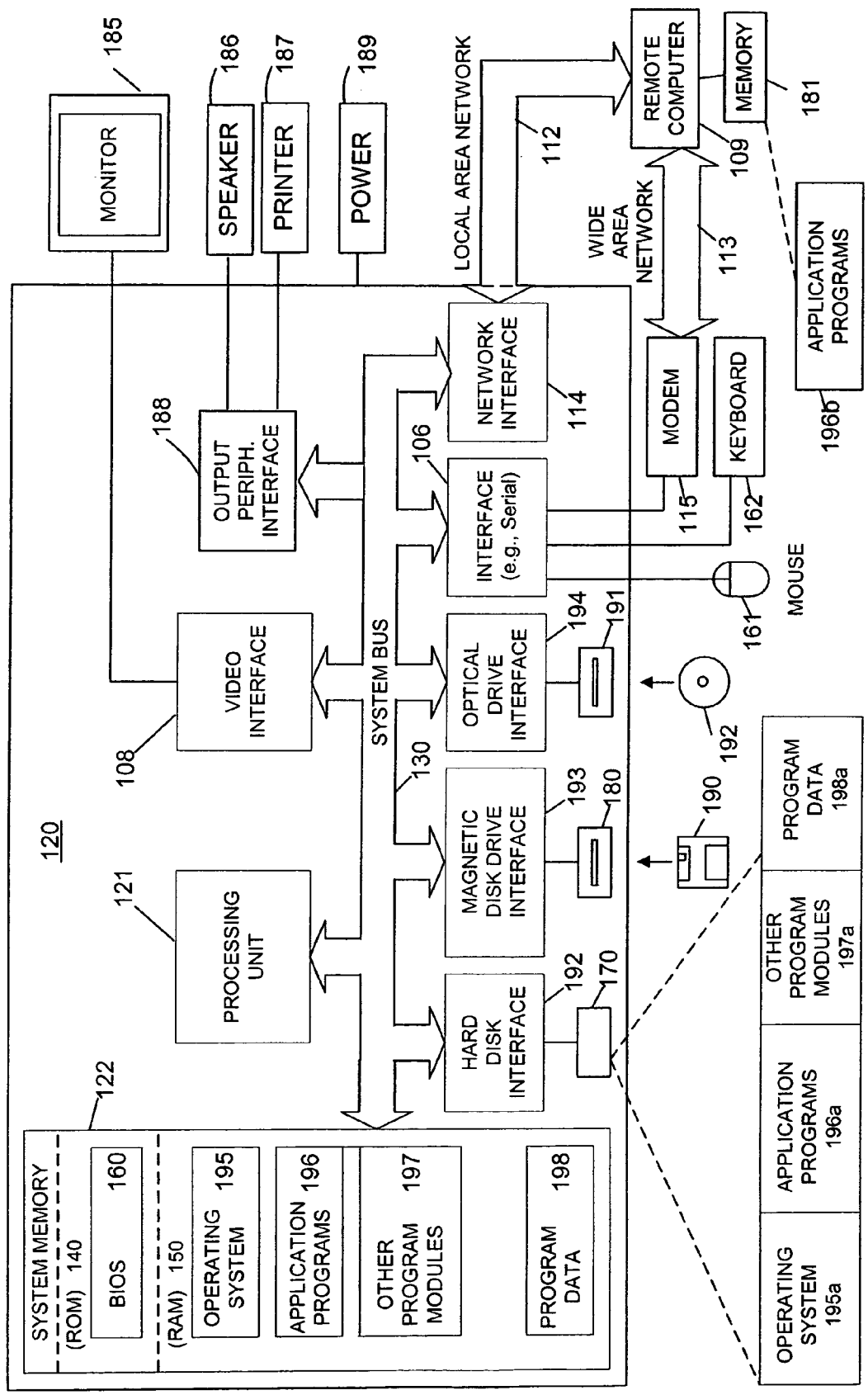
FIG. 1 shows a computing environment in which one or more aspects of the present invention may be implemented.

FIG. 1 illustrates an example of a suitable computing system device 120 on which the invention may be implemented. The computing system device 120 is only one example of a suitable computing environment, and is not intended to suggest any limitation as to the scope of use or functionality of the invention. Neither should the computing device 120 be interpreted as having any dependency or requirement relating to any one or combination of components illustrated in the example operating device 120.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, pro-ram modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an example system for implementing the invention may include a general-purpose computing device in the form of a computer 120. Components of computer 120 may include, but are not limited to, a processing unit 121, a system memory 122, and a system bus 130 that couples various system components including the system memory to the processing unit 121. The system bus 130 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 120 typically includes a variety of computer readable media. Computer readable media can be any available media that can be accessed by computer 120 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 120. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 122 includes computer storage media in the form of volatile and/or nonvolatile memory such as read only memory (ROM) 140 and random access memory (RAM) 150. A basic input/output system 160 (BIOS), containing the basic routines that help to transfer information between elements within computer 120, such as during start-up, is typically stored in ROM 140. RAM 150 typically contains data and/or program modules that are immediately accessible to and/or presently being operated on by processing unit 121. By way of example, and not limitation, FIG. 1 illustrates operating system 195, application programs 196, other program modules 197, and program data 198 as also residing within system memory 122.

Figure 2:
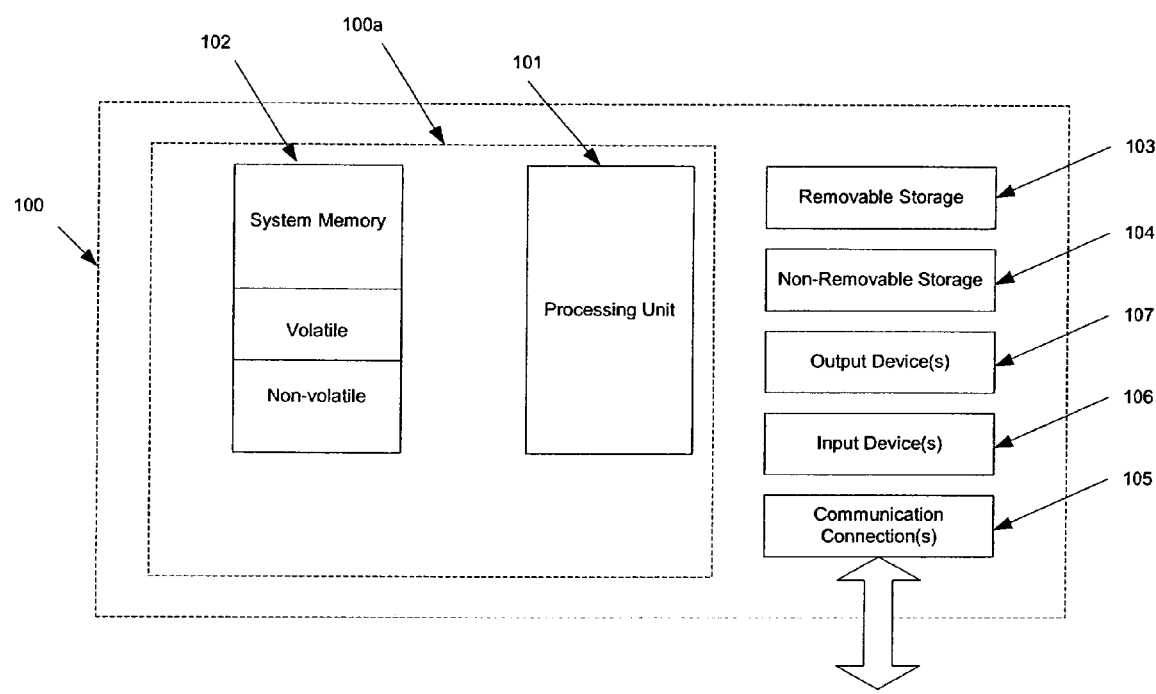
FIG. 2 shows another computing environment in which one or more aspects of the present invention may be implemented

The computer 120 may also include other removable/non-removable, volatile/nonvolatile computer storage media. By way of example only, FIG. 2 illustrates a hard disk drive 170 that reads from and/or writes to magnetic media, such as non-removable, non-volatile magnetic media, a magnetic disk drive 180 that reads from and/or writes to a removable, non-volatile magnetic disk 190, and an optical disk drive 191 that reads from and/or writes to a removable, non-volatile optical disk 192 such as a CD-ROM or other optical media. The hard disk drive 170 may be connected to the system bus 130 through an non-removable memory interface such as interface 192, and magnetic disk drive 180 and optical disk drive 191 may be connected to the system bus 130 by a removable memory interface, such as interfaces 193 and 194. Other removable/non-removable, volatile/non-volatile computer storage media that can be used in the example operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 1 provide storage of computer readable instructions, data structures, program modules and other data for the computer 120. In FIG. 1, for example, hard disk drive 170 is illustrated as storing operating system 195a, application programs 196a, other program modules 197a, and program data 198a. Note that these components can either be the same as or different from operating system 195, application programs 196, other program modules 197, and program data 198. Operating system 195a, application programs 196a, other program modules 197a, and program data 198a are given different numbers here to illustrate that, at a minimum, they are different copies. A user may enter commands and information into the computer 120 through input devices such as a keyboard 162 and/or pointing device 161, commonly referred to as a mouse, trackball or touch pad. Other input devices (not shown) may include a microphone, joystick, game pad, satellite dish, scanner, or the like. These and other input devices are often connected to the processing unit 121 through an interface 123 that may be coupled to the system bus 130, but may also be connected by other interface and bus structures, such as a parallel port, game port or a universal serial bus (USB). A monitor 185 or other type of display device may also be connected to the system bus 130 via an interface, such as a video interface 108. In addition to the monitor, computers may also include other peripheral output devices such as speakers 186 and printer 187, which may be connected through an output peripheral interface 188. The computer 120 may also include a power source 189, which may supply electrical power to some or all of the components shown in FIG. 1. The power source may be a direct-current source, such as a battery, and may alternatively provide alternating current electricity, such as a wall outlet.

The computer 120 may operate in a networked environment using logical connections to one or more remote computers, such as a remote computer 109. The remote computer 109 may be a personal computer, a server, a router, a network PC, a peer device or other common network node, and typically includes many or all of the elements described above relative to the computer 120, although only a memory storage device 181 has been illustrated in FIG. 1. The logical connections depicted in FIG. 1 include a local area network (LAN) 112 and a wide area network (WAN) 113, but may also include other networks. Such networking environments are commonplace in offices, enterprise-wide computer networks, intranets and the Internet.

When used in a LAN networking environment, the computer 120 may be connected to the LAN 112 through a network interface or adapter 114. When used in a WAN networking environment, the computer 120 typically includes a modem 115 or other means for establishing communications over the WAN 113, such as the Internet. The modem 115, which may be internal or external, may be connected to the system bus 130 via the interface 123, or other appropriate mechanism. In a networked environment, program modules depicted relative to the computer 120, or portions thereof, may be stored in the remote memory storage device. By way of example, and not limitation, FIG. 1 illustrates remote application programs 196b as residing on memory device 181. It will be appreciated that the network connections shown are examples, and other means of establishing a communications link between the computers may be used.

With reference to FIG. 2, a more generalized example system for implementing one or more embodiments of the present invention includes a computing device 100. In its most basic configuration, computing device 100 typically includes at least one processing unit 101 and memory 102. Depending on the exact configuration and type of computing device, memory 102 may be volatile (such as RAM), non-volatile (such as ROM. flash memory, etc.) or some combination of the two. This most basic configuration is illustrated in FIG. 2 by dashed line 100a. Additionally, device 100 may also have additional, features and/or functionality. For example, device 100 may also include additional storage (removable and/or non-removable) including, but not limited to, magnetic or optical disks or tape. Such additional storage is illustrated in FIG. 2 by removable storage 103 and non-removable storage 104. Computer storage media includes volatile and nonvolatile, removable and non-removable media implemented in any method or technology for storage of information such as computer readable instructions, data structures, pro-ram modules or other data. Memory 102, removable storage 103 and non-removable storage 104 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 105 that allow the device to communicate with other devices. Communications connection(s) 105 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 106 such as keyboard, mouse, pen, voice input device, touch input device, etc. Output device(s) 107 such as a display, speakers, printer, etc. may also be included. All of these devices are well-known in the art and need not be discussed at length here.

Although FIGS. 1 and 2 depict systems in which one or more aspects of the present invention may be implemented, it will be understood that aspects of the present invention may be implemented on any number of computing systems and/or devices that may vary from these example systems. For example, aspects of the present invention may be implemented on a computing device that has fewer than all of the devices depicted in FIGS. 1 and 2, and discussed above. As a further example, aspects of the present invention may be implemented on any device that possesses the basic configuration 100*a*, shown in FIG. 1, having a form of processing unit 101/121 and a form of memory 102/122 as shown in FIGS. 1 and 2. Accordingly, aspects may be implemented on a personal computer, network computer, cellular telephone, mobile pager, personal data assistant, wristwatch, desk or wall clock, home entertainment unit, television, set-top box, audio and/or video equipment, laptop computer, etc.

During operation, a processing unit 101/121 may execute a series of instructions at the direction of, for example, one or more application programs 196. Execution of these instructions, portions of these instructions, or groups of these instructions by the processing unit 101/121 may commonly be referred to as a "process". For example, a stock market application might have one process for monitoring the current time, a second process for displaying an advertisement on the screen, and a third process for changing the advertisement based on the current time. Some types of processes are actually implemented to monitor the operation of other processes within the system. For example, one process might monitor the use, by other processes, of a system's processing unit.

Figure 6:
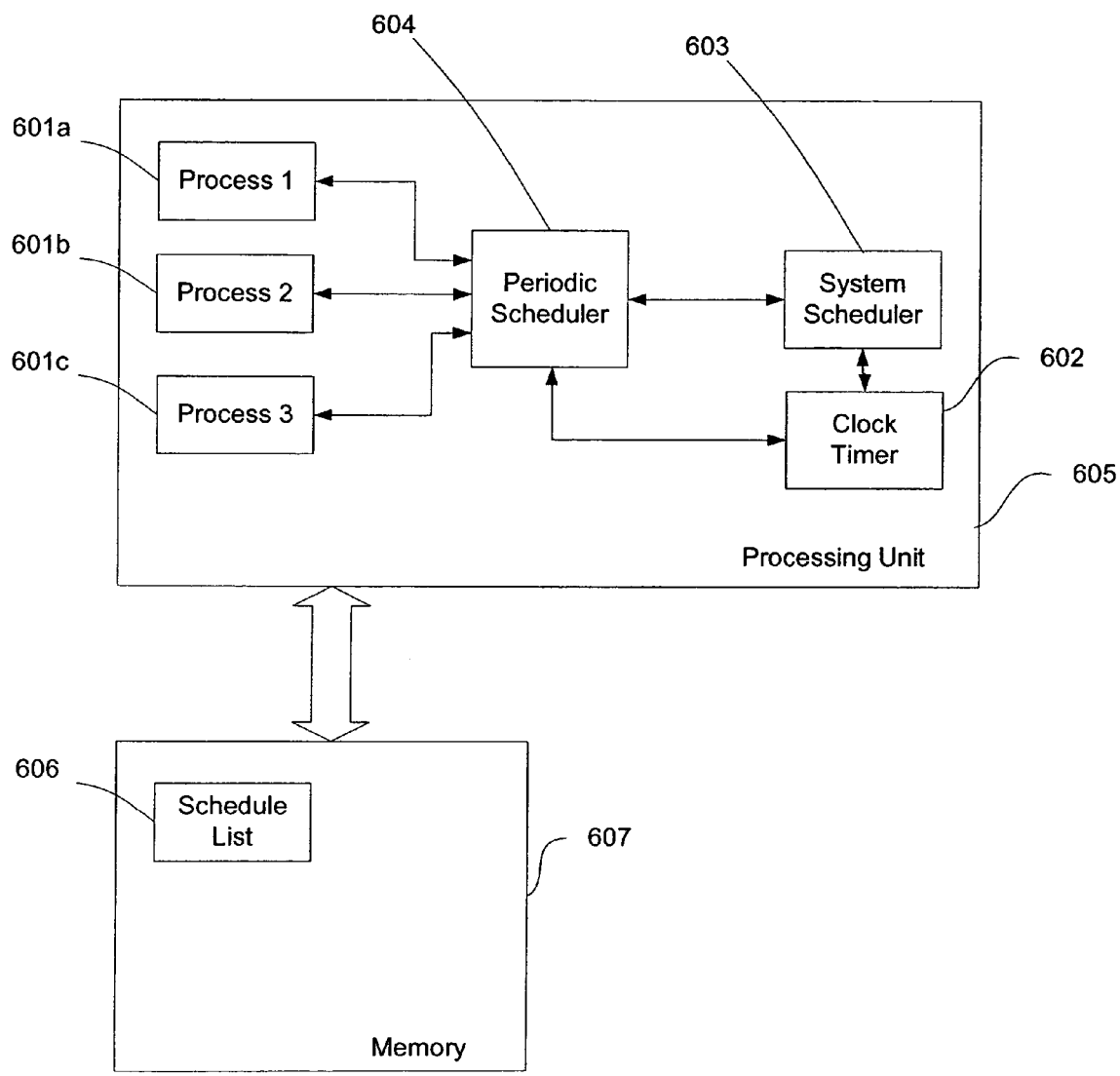
FIG. 6 shows logical relationships according to one embodiment of the present invention.

In one or more embodiments of the present invention, a periodic scheduler may be implemented to monitor and/or administer one or more periodic events, activities, and/or processes that require some form of activity after a given period of time. The periodic scheduler, and other processes, may be executed by the processing unit 101/121 of the systems shown in FIGS. 1 and 2, for example. Other processes may also be implemented on the processing unit 101/121, such as a clock timer, system scheduler, and one or more processes that are monitored by the process monitor. FIG. 6 shows a logical diagram for an example embodiment, and depicts processes 601*a*-*c*, clock timer 602, system scheduler 603, and periodic scheduler 604 operating on processing unit 605.

The periodic scheduler may use a schedule list of periodic events, which may be stored in a memory accessible to the processing unit 101/121, such as system memory 102/122. FIG. 6 shows an example schedule list 606 stored in memory 607. The schedule list may contain entries indicating periodic times at which an action is to be taken. For example, the following example schedule list may be used with one or more embodiments:

| Time | Event Identifier |
|------|------------------|
| 12   | Process A        |
| 16   | Process B        |
| 24   | Process A        |
| 32   | Process B        |
| 36   | Process A        |
| 48   | Process A; Process B |

This list includes entries for various times at which an activity or event, associated with the Event Identifier (e.g., Process A, Process B), is to occur. The times may be entered in the schedule list upon registration by a particular process requesting the scheduled periodic event, and may be measured with respect to a predefined origin time (when time equals zero). The Event Identifier may identify a particular periodic process that is to occur, or it may simply identify the target or process for which a predefined periodic action or event is to occur (if the predefined periodic action or event is already known).

In the above example list, two processes (processes A and B) have registered with the process monitor. Process A has registered with a period of 12 time units, indicating that its requested periodic event (identified by "Process A") is to occur once every 12 time units. Process B is shown registered with a period of 16 time units. In one embodiment, the time units are quarter-second intervals, resulting in a "Process A" period of 3 seconds, and a "Process B" period of 4 seconds. Accordingly, the periodic events for Processes A and B would occur at integral multiples of their respective periods (e.g., 12, 24, 36, 48 etc. for Process A, and 16, 32, 48, etc. for Process B).

Figure 3A:
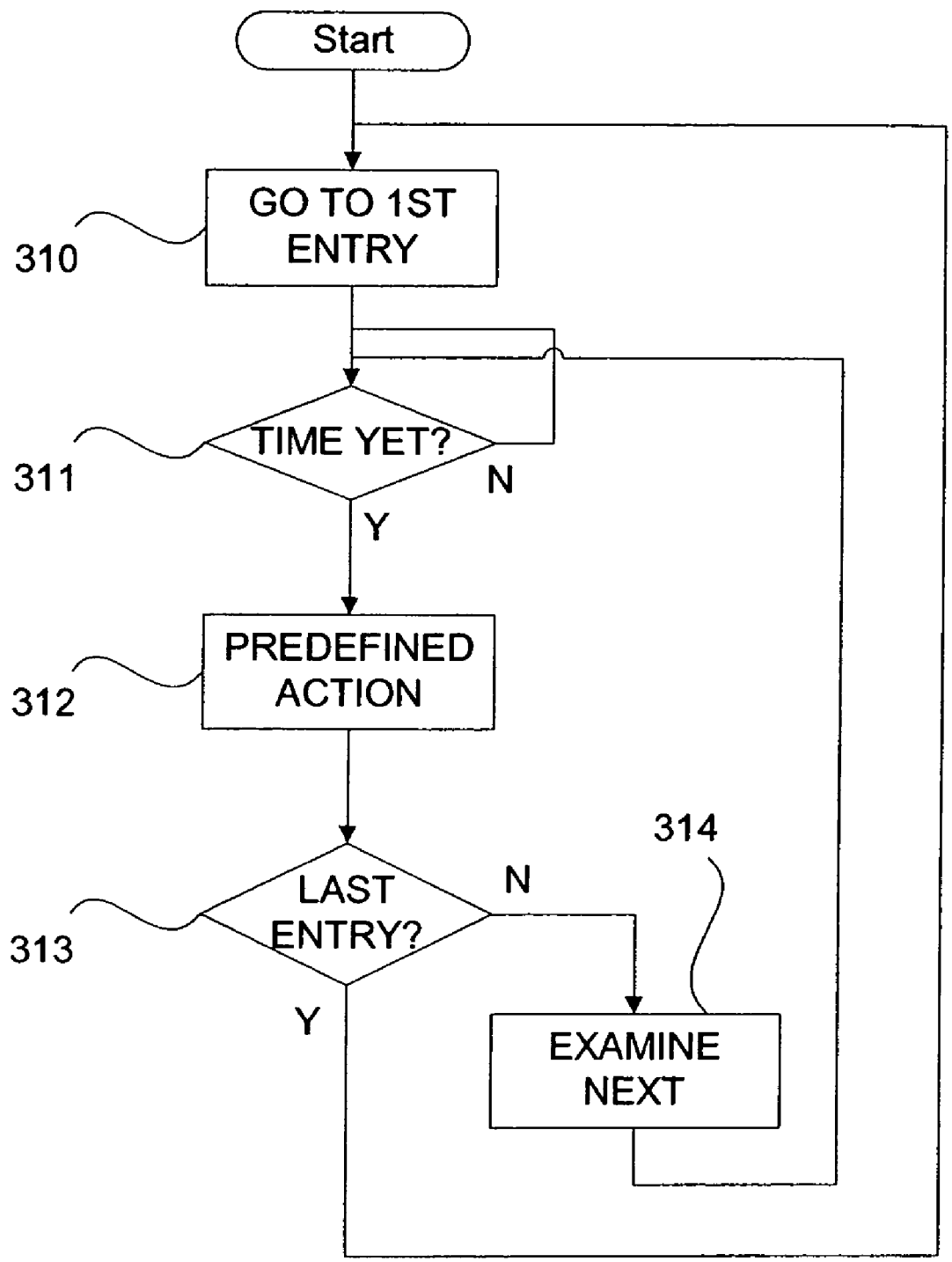
FIG. 3a shows a process flow for a periodic process monitor according to one aspect of an embodiment of the present invention.

In using the example list to carry out the scheduled periodic events, and as shown in FIG. 3*a*, the periodic scheduler may initially start at step 310, in which it resets a timer value and examines the first entry in the schedule list. The first entry in the example list has a time value of 12 (e.g., 3 seconds), and an action identifier of "Process A". The scheduler waits, in step 311, until a current time equals or exceeds the time value. Alternatively, the scheduler may wait until a predefined period of time prior to (or after) the actual time value. This alternate embodiment may be helpful where, for example, a large number of events are scheduled and the predefined period of time helps offset any delay resulting from carrying out the scheduled events.

At the scheduled time, in step 312, the scheduler executes the predefined periodic process(es), action(s), or event(s) for the current entry. In the example, the first action identifier is for Process A, and the scheduler may execute whatever periodic event is to occur for Process A. If the current entry contained more than one action identifier, then it may execute more than one corresponding periodic event. Predefined periodic processes, actions, and events may be any predefined activity, including sending a synchronization signal, executing a corrective process, waking another process, etc.

Upon executing the periodic event, the scheduler then determines, in step 313, whether it just handled the last entry in the list. If it did not, then the scheduler examines, in step 314, the next entry in the list to determine the next time at which it is needed. The scheduler then returns to step 311 to wait until the next time in the list (e.g., time t=16).

If, in step 313, the scheduler had handled the last entry in the list, then the scheduler process returns to step 310, resetting the current timer back to zero, and once again examining the first entry in the list. This process may occur indefinitely, but may terminate if the schedule list is edited to remove some or all entries, or if another command is issued to terminate the process (e.g., the computing device is powered down).

Returning to the example schedule above, at time t=48, the final entry in the schedule list includes two action identifiers, "Process A" and "Process B". When time t=48 in step 311, the scheduler may execute, in step 312, the periodic process for both Process A and Process B. Although two processes are used in the example schedule, it will be understood that any number of processes may be registered. It will also be understood that the periodic action for the various registered processes may be modified as necessary after registration. In some embodiments, the schedule list contains sufficient entries such that the final entry lists all registered processes. Such an entry would have a time value of the least common multiple of all the periods of the registered processes. However, it will be understood that variations to the list may function as well, such as extending the list beyond the least common multiple to include more entries, or implementing the list as separate lists.

Figure 3B:
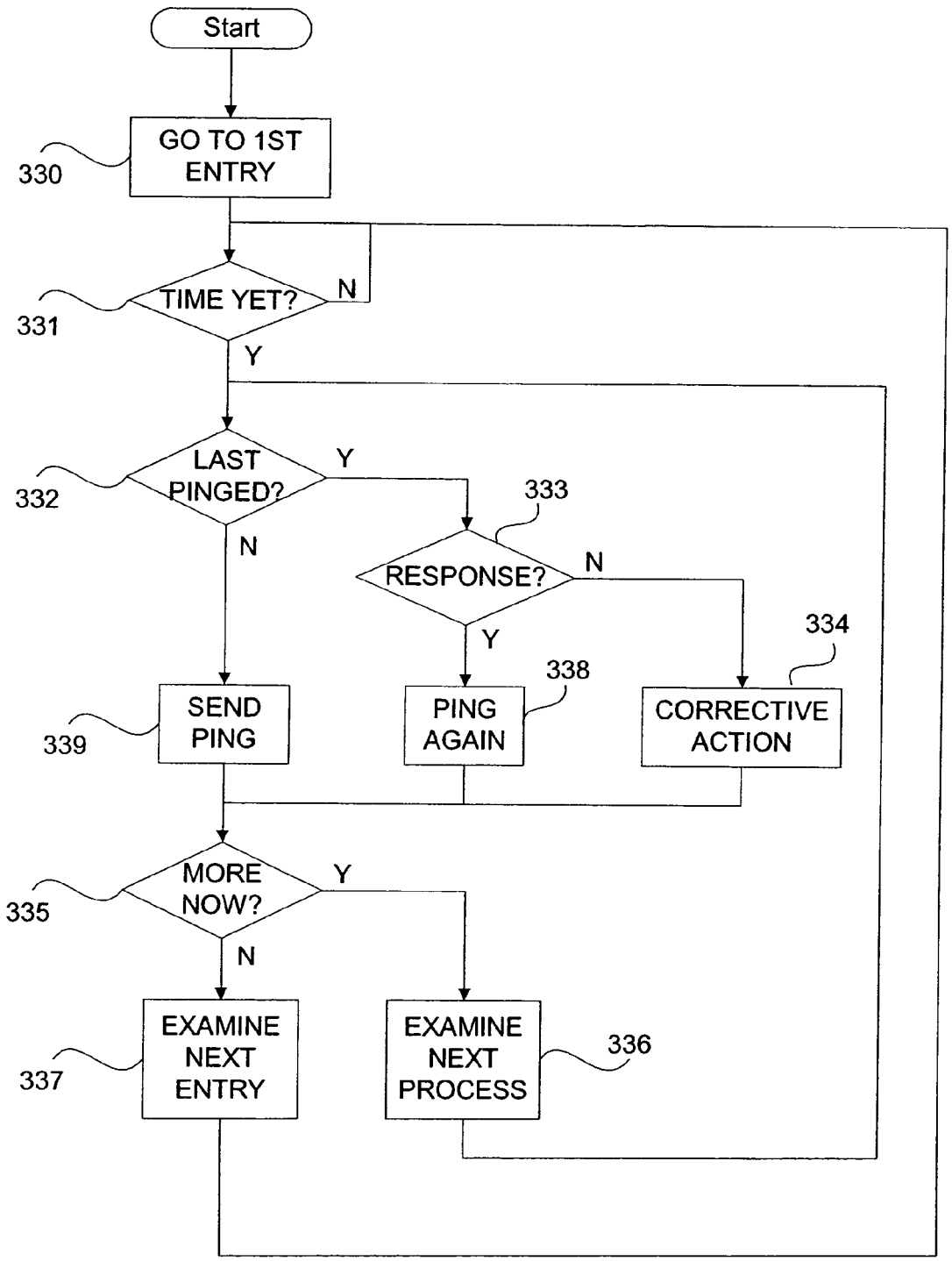
FIG. 3b shows another process flow according to one aspect of an embodiment of the present invention.

FIG. 3b shows an example embodiment of the FIG. 3a method. In the FIG. 3b embodiment, the periodic scheduler may serve as a process monitor to monitor a number of processes (such as in a critical process monitor) using a "ping and response" approach. In such an embodiment, the periodic activity generally consists of sending signals, or system calls, between the scheduler and the registered processes to verify that the registered processes remain active, or that a particular periodic process is occurring. In some embodiments, a series of "pings" and "responses" may be used to verify that a process remains active. A "ping" is a request from the scheduler to the registered process indicating that the registered process must respond to prove that it remains active. The registered process must then send a response to the scheduler before its specified period elapses, and if such a response is not sent, then the scheduler may assume the registered process is no longer active, and take further action. Such further action may include simply sending a notification signal to another process, recording a log of the inactive registered process, corrective action (e.g., restarting the registered process), or any other predefined activity.

The ping and response may be implemented in any of a number of ways, such as using a predefined system call addressed to a particular process or processes. In some embodiments, the actual capture of a ping and response may occur without the assistance of the process monitor, and may be handled by the underlying operating system and/or a different process from the process monitor. The various pings sent and responses received may be logged and/or stored in any memory of the system accessible to the scheduler. The following description offers more detail on the FIG. 3b example embodiment.

The FIG. 3b method is similar to that of FIG. 3a, with the exception-that the predefined process, step 312, is expanded to allow the two-way "ping and response" communication used in the example embodiment process monitor. When the process begins, a system timer is reset to zero and then started, and the scheduler examines the first entry in the schedule list in step 330. The scheduler waits, in step 331, until the time indicated by the first entry (e.g., when the current time counter equals or exceeds the time specified in the current entry). During this wait, the process-monitoring scheduler may render itself inactive, further conserving power, by scheduling a "wake up" time with another scheduler process. This other scheduler process may be shared by other processes in the system, resulting in "nested" scheduler processes, and may help further reduce the overall number of timers used in the system.

When the appropriate time arrives, the scheduler may determine, in step 332, whether the current registered process (identified by the entry's action identifier) was already pinged previously. The status of each registered process, such as whether it was previously pinged, may be maintained in any memory of the system as, for example, a table or list of data and/or flags.

If the registered process was previously pinged, then the scheduler may check, in step 333, to see if a response was received from the registered process. As stated above, the transmission, receipt, logging and handling of pings and/or responses may be handled by a process other than the scheduler, and may also be handled by the underlying operating system itself.

If, in step 333, no response has been received from the registered process, then the scheduler may take appropriate action in step 334. The appropriate action may vary depending on the registered process, and may include such actions as sending a notification to another process, system, device, user, etc.; restarting a critical process; restarting and/or rebooting the computing system; initiating another process, device, etc.; recording the lack of response in a log, and the like. After taking the appropriate action, the scheduler may then examine the current entry, in step 335, to determine if another registered process is listed at the same time. If so, then the scheduler examines, in step 336, the next registered process in the current entry, and then returns to step 332 to handle the next registered process.

If, in step 335, no more processes remain to be checked at the current time, the scheduler may then examine the next entry from the schedule list in step 337. Once the next entry is loaded, the scheduler may return to step 331 to wait (or sleep) until the time indicated in the next entry. Again, this waiting may be accomplished using a system scheduler to further conserve power.

If, in step 333, a response was received from the registered process, then the scheduler may simply send another ping to the registered process in step 338. The scheduler may then handle other registered processes and/or other entries in step 335, as described above.

If, in step 332, no ping has been sent to the current registered process, then the scheduler may send an initial ping to the registered process in step 339. After sending the ping, the scheduler may handle other registered processes and/or other entries in step 335, as described above.

Many alternative embodiments are possible, and will be apparent using the present disclosure. For example, the scheduler may eliminate steps 332 and 333 by simply sending an initial ping immediately upon registration of the process (discussed below) with the scheduler. In alternate embodiments, the schedule list might simply have time entries. In this embodiment, the scheduler may store, in the same or a separate list, an identification of each registered process and its period. Then, at each time in the schedule list, the scheduler may determine which registered process(es) to handle simply by comparing a current timer with the periods of the various registered processes, and assuming that the current registered processes for handling are those whose periods divide evenly into the current timer value.

Figure 4A:
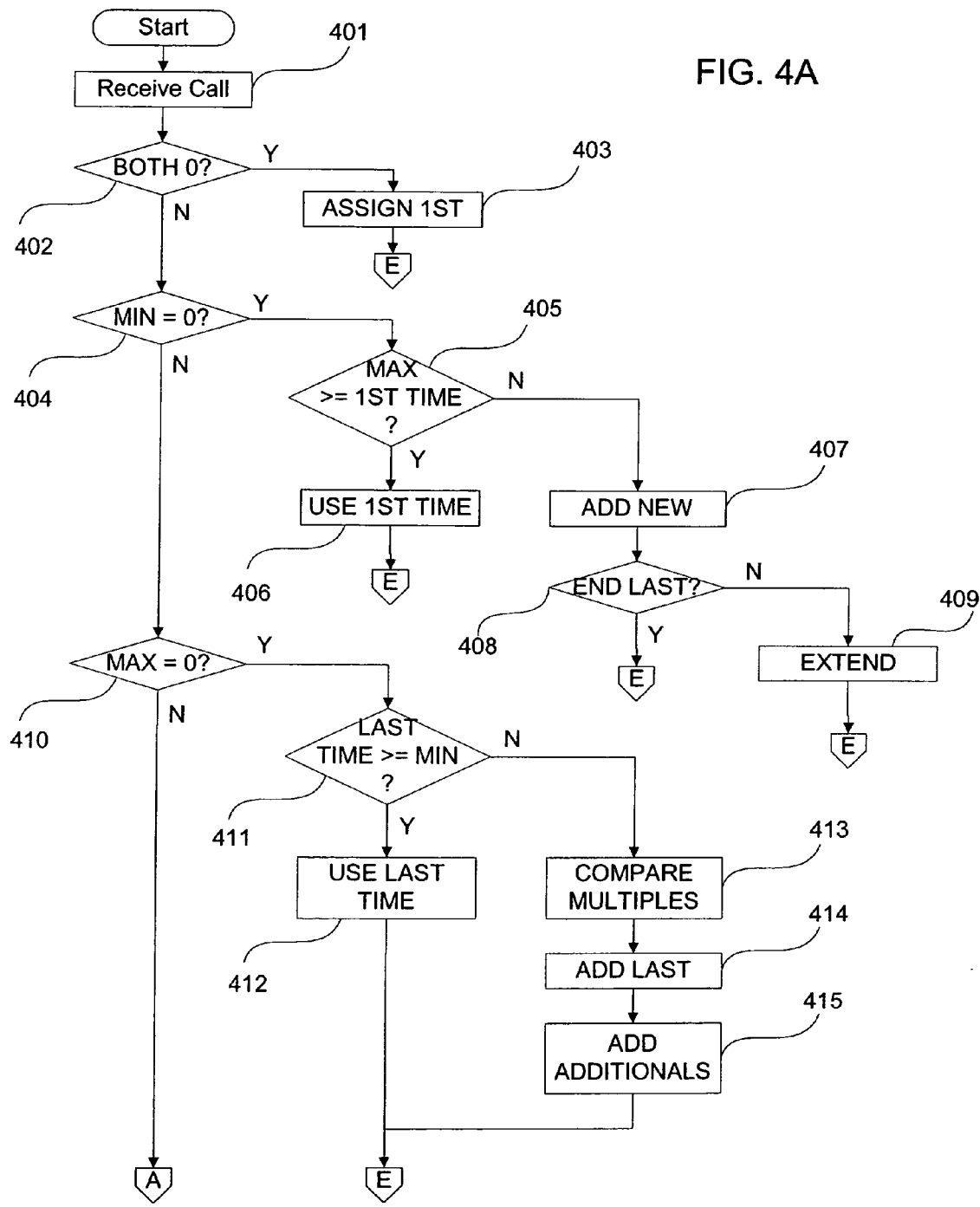
FIGS. 4a and 4b (together, FIG. 4) depicts an example process flow for handling a request to add a new periodic process or event to an existing schedule list of periodic processes, actions, or events.
Figure 4B:
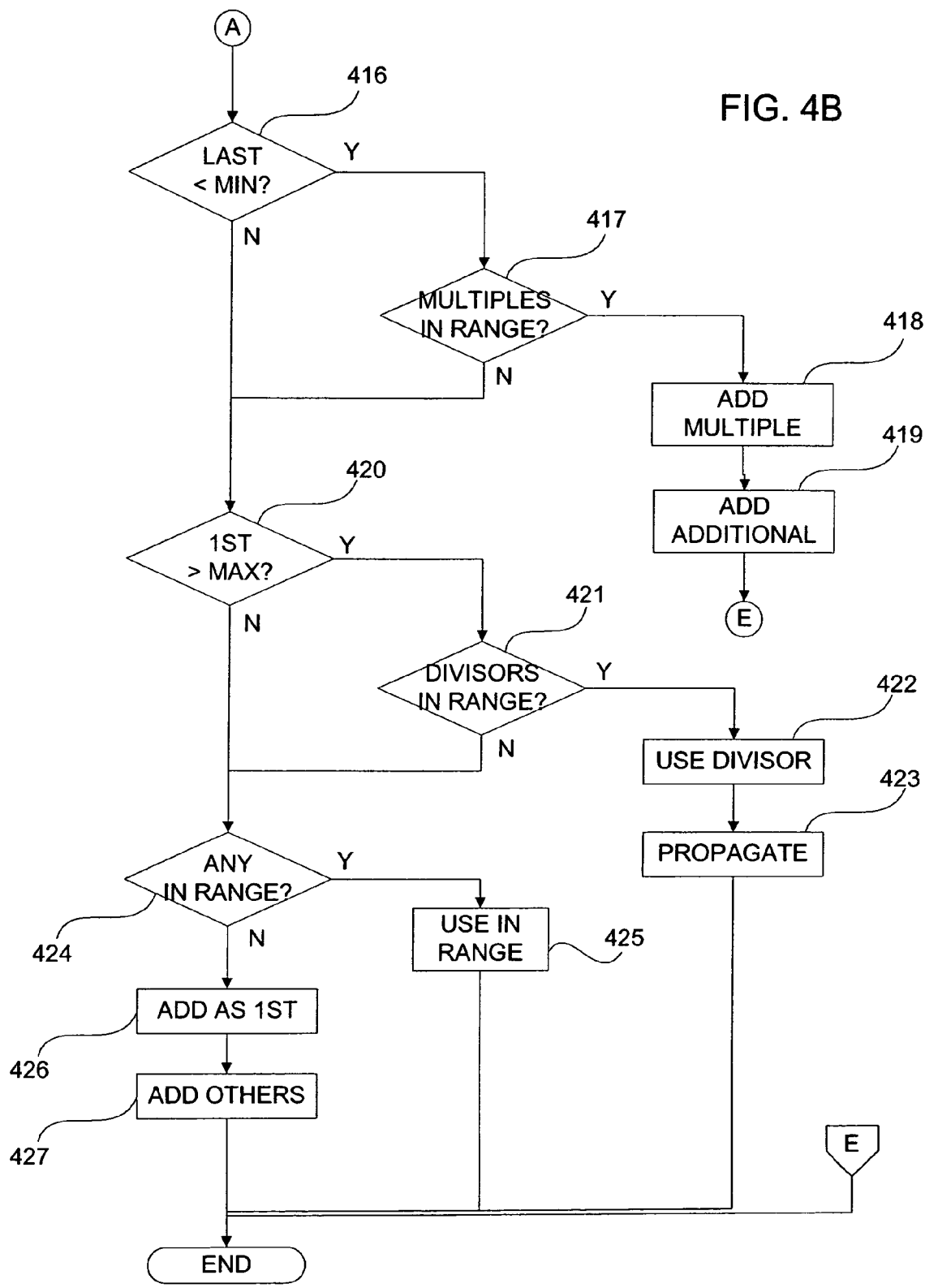

FIG. 4 shows an example method by which a process may register itself with a periodic scheduler. Initially, at step 401, a process may register itself by making a system call to the scheduler. The system call may appear as code in any format, depending on the computer system, programming language, and/or other factors, and an example system call may appear as follows: p1 CPMRegister (MIN, MAX, ID);

This example call passes two time values for the time period, and an event identifier of the registering process or periodic process that is to occur. In such an embodiment, the event identifier simply identifies the process (e.g., it acts as a process identifier), and it is understood that the predefined action is the ping/response function described above. The first time value may be a minimum period parameter (MIN) identifying a minimum time value of the period in which a periodic process is to occur. This minimum time value may be measured in any unit of time, such as milliseconds, seconds, minutes, etc., and may be used for example, if the requesting process needs a periodic process to occur no more than once every [MIN] seconds (or quarter seconds, half-seconds, etc.).

The second time value may be a maximum period parameter (MAX) that identifies a maximum time value of the period in which the period process is to occur. Like the MIN parameter, the MAX parameter may also be expressed in any unit of time. A process can use the MAX parameter to, for example, specify that a periodic process is to occur at least once every [MAX] seconds.

A third parameter may be the event identifier parameter (ID), which may identify the process making the system call, the process that is being registered (e.g., if the underlying periodic process is already known), and/or the periodic event that is to occur. Many variations to this example system call are also possible. For example, the parameters may be added, removed, or modified. The event identifier parameter may be omitted as a parameter of the system call itself if, for example, the event is predetermined or if the event is identified by the call itself (e.g., if the system call already includes information identifying the event and/or the process making the call).

In alternative embodiments, one or both of the time values may be expressed in terms of a "don't care" value, indicating that the requesting process does not care what the minimum and/or maximum time period is to be. Such a value may be expressed as a zero time value, and may represent an open end of a time range, or a wildcard value. Using these parameters, a process may request a periodic process to occur at least once every 3.5 seconds, only once every 3.5 seconds, once every 1-2 seconds, no more than once every 5 seconds, etc.

Upon receiving the system call, the periodic scheduler may first determine, in step 402, whether the system call specified a "don't care" value for both MAX and MIN. If both values are zero, then the scheduler may infer that the requesting process does not care how often the periodic process occurs, and simply wants the periodic process to occur. This might be appropriate, for example, when the requesting process simply wants a periodic process to occur "every once in a while", but does not really care how frequently (or infrequently) the periodic process occurs. If both MAX and MIN are zero, the scheduler moves to step 403, at which time the identifier ID is added to the first entry in the schedule list. Once added, the periodic process associated with ID will occur each time the first entry in the schedule list is handled by the scheduler discussed above with respect to FIG. 3b.

If, in step 402, MIN and MAX are not both zero, they are checked in step 404 to determine whether the MIN is zero. If the MIN value is zero, then the MAX value is checked, in step 405, to determine whether the MAX value equals or exceeds the time value of the first entry in the schedule list. If it does, then, in step 406, the ID is simply added to the first entry in the schedule list. This addition is also propagated throughout all entries in the list that are integral multiples of the first entry's time value. Upon doing so, the periodic process corresponding to ID will simply occur along with the other process(es) associated with the first entry in the schedule list. To illustrate, if the existing list contained the following entries:

| | |
|---|---|
| 7 | Process A |
| 12 | Process B |
| 14 | Process A |
| 21 | Process A |
| 24 | Process B | then a system call having MAX=0, MIN=0 and ID="Process C" would simply insert "Process C" along with the first entry (and its integral multiples). The resulting list would contain the following entries:

| | |
|---|---|
| 7 | Process A; Process C |
| 12 | Process B |
| 14 | Process A; Process C |
| 21 | Process A; Process C |
| 24 | Process B |

The registration process then concludes at step 428.

If, in step 405, the MAX value is less than the time value of the first entry in the schedule list, a new entry to the list is generated in step 407. This new entry will include a process identifier of ID, and a new time value that is less than or equal to the MAX value, and is preferably a divisor of an existing registered process' period. For example, if the list already had entries with time values of 12 and 16, the process would compare the MAX value with 6, 4, 3, 2 (the divisors of 12) and 8, 4, and 2 (the divisors of 16) to find a divisor that is less than MAX. If no divisors are less than MAX, then the new entry will simply have MAX itself as a period.

Although the value 1 is also a divisor of 12, it is ignored in the example embodiment. Alternate embodiments, however, may choose to use 1 as a valid divisor. Using 1 simply produces a large number of entries in the schedule list. Further embodiments may choose to ignore other divisors (such as 2, 3, etc.) to affect the resulting list. Further embodiments may also ignore divisors that have already been compared to the MAX value, to avoid redundancy. In the above example, the process might compare MAX with 6, 4, 3 and 2 (the divisors of 12), and 8 (the divisors of 16, excluding 4 and 2, which have already been compared). Numerous other modifications are also possible, such as placing all divisors in a sorted list, or using such a list from the largest to the smallest, and taking the largest divisor that is also less than MAX.

Step 407 includes the addition of a new first entry, as discussed above. Step 407 also includes the propagation of the new entry through the schedule list to include additional entries for each integer multiple of the period specified in the first new entry, up to the time specified in the last entry in the list. This may require the addition of new entries for the integral multiples of the new time value (if no entry for such time already exists), and/or the modification of existing entries (if an entry already exists for the time, and simply needs to add the new ID). As an example of step 407, if the schedule list presently contains the following entries:

| | |
|---|---|
| 12 | Process A |
| 24 | Process A |
| 36 | Process A | and the new system call includes a MIN value of zero, a MAX value of 9, and an ID of "Process C", the process would arrive at step 407. In step 407, the scheduler would compare MAX (9) with the various divisors of 12 (the first time value in the list) to find one that is less than or equal to MAX. In this comparison, the scheduler may consider 6, 4, 3 and 2, and may realize that a period of 6 is both 1) less than MAX, and 2) a divisor of 12. The process may prefer the largest divisor that is also less than MAX, because using the largest divisor helps to minimize the number of times the system wakes up. Using 6, then, as the period for the new entry, and propagating the new entry for the remaining integral multiples of 6, results in the following list:

| | |
|---|---|
| 6 | Process C |
| 12 | Process A; Process C |
| 18 | Process C |
| 24 | Process A; Process C |
| 30 | Process C |
| 36 | Process A; Process C |

The integral multiples of 6 (the chosen new period for Process C) between 6 and 36 (the last entry) are: 6, 12, 18, 24, 30 and 36, and the scheduler seeks to ensure that an entry for Process C (the new ID) exists for each of those times. The entries for times 6, 18 and 30 were added because they did not previously exist, while the entries for 12, 24 and 36 were simply modified to include the Process C ID because entries for those times already existed (for Process A).

In step 407, propagation would continue through the time of the last entry in the schedule list. Then, in step 408, the scheduler determines whether the new periodic process (corresponding to "Process C", in the above example) is listed in the final entry of the schedule list. In some embodiments, the last entry of the schedule list contains IDs for all registered processes. This ensures that no time spent waiting on periodic processes is omitted as the scheduler cycles from the last entry back to the first.

In the example given above, the final entry had a time value of 36, and because the new entry's period of 6 happened to divide evenly into 36, the last entry did indeed contain the new ID (as well as the process identifiers for all previously-registered processes), and the scheduler moves on from step 408 to conclude in step 428.

If the time value of the last entry is not evenly divisible by the period of the new entry, however, then this time value is not a common multiple of the periods of all registered processes. In this case, the scheduler moves to step 409. In step 409, the scheduler begins to add entries to the schedule list corresponding to integer multiples of each of the periods of the registered processes, beginning with the time value of the last entry, and concluding when an entry is added having a time value that is a common multiple of the periods of all registered processes.

To illustrate this process of extending the list, consider the following example in which Process A has already registered with a period of 5 (e.g., 1.25 seconds), and process B has already registered with a period of 7 (e.g., 1.75 seconds). The schedule list would contain the following entries:

| | |
|---|---|
| 5 | Process A |
| 7 | Process B |
| 10 | Process A |
| 14 | Process B |
| 15 | Process A |
| 20 | Process A |
| 21 | Process B |
| 25 | Process A |
| 28 | Process B |
| 30 | Process A |
| 35 | Process A; Process B |

If a new system call is received having parameters of:

MIN=0; MAX=3; and ID="Process C", then the FIG. 4 process would eventually arrive at step 407. In step 407, a new entry for time=3 is entered (using the MAX value since 5 and 7 have no divisors), and then propagated through the time of the last entry, or time=35, by adding (or modifying) entries for all integral multiples of time=3 between 3 and 35. After propagating through the last entry, the list would contain the following entries:

| | |
|---|---|
| 3 | Process C (added) |
| 5 | Process A |
| 6 | Process C (added) |
| 7 | Process B |
| 9 | Process C (added) |
| 10 | Process A |
| 12 | Process C (added) |
| 14 | Process B |
| 15 | Process A; Process C (modified) |
| 18 | Process C (added) |
| 20 | Process A |
| 21 | Process B; Process C (modified) |
| 24 | Process C (added) |
| 25 | Process A |
| 27 | Process C (added) |
| 28 | Process B |
| 30 | Process A; Process C (modified) |
| 33 | Process C (added) |
| 35 | Process A; Process B |

However, at step 408, the last entry (at time=35) does not include Process C (because 35 is not evenly divisible by 3). Accordingly, in step 409, the list would be extended until an entry has a time value of the least common multiple of 5, 7 and 3 (the periods of the registered processes A, B and C, respectively). The least common multiple of these periods is time=105, so the list would be extended out to this time. In extending the list, entries are added and possibly modified for each integral multiple of each period up to and including time=105, resulting in the following schedule list:

| | |
|---|---|
| 3 | Process C |
| 5 | Process A |
| 6 | Process C |
| 7 | Process B |
| 9 | Process C |
| 10 | Process A |
| 12 | Process C |
| 14 | Process B |
| 15 | Process A; Process C |
| 18 | Process C |
| 20 | Process A |
| 21 | Process B; Process C |
| 24 | Process C |
| 25 | Process A |
| 27 | Process C |
| 28 | Process B |
| 30 | Process A; Process C |
| 33 | Process C |
| 35 | Process A; Process B |
| 36 | Process C |
| 39 | Process C |
| 40 | Process A |
| 42 | Process B; Process C |
| 45 | Process A; Process C |
| 48 | Process C |
| 49 | Process B |
| 50 | Process A |
| 51 | Process C |
| 54 | Process C |
| 55 | Process A |
| 56 | Process B |
| 57 | Process C |
| 60 | Process A; Process C |
| 63 | Process B; Process C |
| 65 | Process A |
| 66 | Process C |
| 69 | Process C |
| 70 | Process B; Process A |
| 72 | Process C |
| 75 | Process A; Process C |
| 77 | Process B |
| 78 | Process C |
| 80 | Process A |
| 81 | Process C |
| 84 | Process B; Process C |
| 85 | Process A |
| 87 | Process C |
| 90 | Process A; Process C |
| 91 | Process B |
| 93 | Process C |
| 95 | Process A |
| 96 | Process C |
| 98 | Process B |
| 99 | Process C |
| 100 | Process A |
| 102 | Process C |
| 105 | Process A; Process B; Process C |

The schedule list once again ends with an entry containing all registered processes. Using such a list, when the scheduler circulates from the last entry back to the first, the timer can safely be reset to zero without losing any time spent waiting on processes. After expanding the schedule list, the FIG. 4 process terminates in step 428.

If, in step 404, the MIN value was not zero, then the scheduler moves to step 410, which determines whether the MAX value is zero. If the MAX value is zero, then in step 411, the time value of the last entry in the schedule list is compared with the MIN value. If the time value of the last entry in the schedule list is greater than or equal to the MIN value, then the last entry will be modified in step 412 to include the ID process identifier, and the FIG. 4 process can conclude in step 428. This modification may essentially add the new periodic process to occur once per cycle through the schedule list.

If, in step 411, the time value of the last entry in the schedule list is less than the MIN value, then the scheduler, in step 413, sequentially compares the MIN value with the integer multiples of the time value of the last entry in the schedule list, beginning with the lowest such multiple, until a multiple is found that exceeds or equals the MIN value. This multiple is then used as the time value for a new "last" entry that is added to the schedule list in step 414. This new entry will now be the last entry in the list, as it will inherently have a time value that is the least common multiple of the periods for all registered processes (including the newest one). Then, in step 415, the schedule is expanded to contain additional entries having time values that are integer multiples of the periods for the various registered processes, where the time values lie between the time values of the old and new last entries in the list.

As an example, consider a situation in which Process A has registered with a period of 3 (e.g., 0.75 seconds), and Process B has registered with a period of 4 (e.g., 1 second). The existing schedule list would contain the following entries:

| | |
|---|---|
| 3 | Process A |
| 4 | Process B |
| 6 | Process A |
| 8 | Process B |
| 9 | Process A |
| 12 | Process A; Process B |

Then, assume a system call is received having MIN=30, MAX=0, and ID="Process C" (the MAX value may be a zero to indicate a "don't care" value). The FIG. 4 process would lead to step 413. The time value of the last entry is 12, and in step 413, the FIG. 4 process would begin comparing integer multiples of this value with the MIN value to find a multiple that is greater than or equal to the MIN value. The multiples of 12 are 12, 24, 36, etc. In comparing these with MIN, the value 36 is the first multiple (beginning with the lowest multiple) that is greater than or equal to MIN (30), and as such, a new entry will be made having a time value of 36 and process identifiers for all registered processes. The resulting list would contain the following entries:

3 Process A

| | |
|---|---|
| 4 | Process B |
| 6 | Process A |
| 8 | Process B |
| 9 | Process A |
| 12 | Process A; Process B |
| 15 | Process A |
| 16 | Process B |
| 18 | Process A |
| 20 | Process B |
| 21 | Process A |
| 24 | Process A; Process B |
| 27 | Process A |
| 28 | Process B |
| 30 | Process A |
| 32 | Process B |
| 33 | Process A |
| 36 | Process A; Process B; Process C |

Using this list, the periodic process corresponding to Process C would occur once every cycle through the list, or 36 time units (e.g., 9 seconds).

If, in step 410, the MAX value is not zero, then neither MIN nor MAX are zero, and the scheduler moves to step 416, in which the time value of the last entry is compared with the MIN value. If this time value is less than the MIN value, then the scheduler moves to step 417, which determines whether any integer multiples of this time value falls within the range specified by MIN and MAX (inclusive). If any such multiple does fall in this range, then a new entry is added, in step 418, having that multiple as a time period value, and the new ID as the process identifier. The new entry, having a time value that is an integer multiple of the previous last value, is inherently a common multiple of the periods of all previously-registered processes, and the new entry serves as the new last entry in the schedule list, having process identifiers for all registered processes. As such, the periodic process for the newly-registered process would be executed once each time the monitor passed through the schedule list.

In step 419, additional entries are added to "fill-in" the schedule list for the time values between the time value of the previous "last" entry and the new last entry. This step of filling in is similar to step 415, and may simply involve examining the period of each registered process, adding entries for the integer multiples of these periods that lie between the time value of the previous "last" entry and that of the new last entry, until the time value of the new final entry is reached.

If, in step 417, there are no multiples of the time value for the last entry in the schedule list that fall between MIN and MAX (inclusive); or if, in step 416, the time value of the last entry is not less than MIN; then the scheduler moves to step 420. In step 420, the time value of the first entry in the schedule list is compared with the MAX value. If this first time value is greater than MAX, then the scheduler moves to step 421. In step 421, the scheduler compares each divisor (if any) of the first time value with the range specified by MIN and MAX. If a divisor falls within this range, then a new first entry will be added in step 422 having the divisor as a time value, and the new process ID as a process identifier. After adding the new first entry, the rest of the schedule list is filled-in with entries to have the ID's process performed at every time value that is an integer multiple of the divisor. This filling in occurs in step 423, and propagates through until the last entry, which will inherently be an integer multiple of the divisor. The process then concludes in step 428.

If, in step 421, there are no divisors within the specified range; or if, in step 420, the time value of the first entry is not greater than MAX; then the scheduler moves to step 424. In step 424, the scheduler checks to see if any period of a previously-registered process fits within the range. If so, then in step 425, the new ID is added to each schedule entry that contains the process identifier for the matching previously-registered process.

If, in step 424, no period of a previously-registered process fits within the range, then the MIN value is used as a period for the ID process as a default. A new first entry is added in step 426 for the ID, having a time value of MIN. In step 427, additional entries are made to ensure that the process for ID is carried out with a period of MIN. The schedule list is also extended as needed to have the last entry once again have a time value that is the least common multiple of all registered processes. This extension step may be carried out any number of ways, such as determining the least common multiple first, adding a new last entry having this least common multiple as a time value, and then filling in the rest of the schedule list for each registered process. A method similar to steps 407-409 may also be used. The process may then conclude in step 428.

Through the above process, the scheduler may act to synchronize some or all of the various periodic activities related to the registered processes. Accordingly, in some example embodiments, new registered processes may have their periodic "pinging" and/or "response" scheduled to occur at the same time(s) as one or more currently-scheduled processes.

Although the above method steps are described in particular detail, it will be understood that many alternative approaches may be taken to achieve the same result. For example, various mathematical methods may be used to locate a least common multiple, or to propagate a newly-added entry by adding additional entries having time values that are integer multiples a process periods. As another example, a "don't care" value other than zero may be used as parameters. The size of the schedule list may be adjusted by adjusting the range of integer multiples that are used in the various comparisons. The steps in which a divisor is compared (e.g., step 407) may give preference to larger divisors, smaller divisors, or other types of divisors to further adjust the schedule list.

Another alternative may have step 426 using the MAX value as a default, instead of the MIN. A further modification may involve a schedule list that does not end with the least common multiple for a time value. Additionally, the various steps may be rearranged and/or interchanged. For example, steps 424-427 might be made to occur prior to step 416, wherein the system gives preference to using existing periods rather than adding new entries.

In a further embodiment, the various MIN and MAX values associated with the registered processes may be retained by the scheduler, even after the processes have been registered. In such embodiments, when a new process requests registration, the MIN and MAX values for the already-scheduled processes may be retrieved and used once again to determine the most efficient schedule using the least common multiple of the registered process' periods (including the period of the newly-registered process).

Figure 5A:
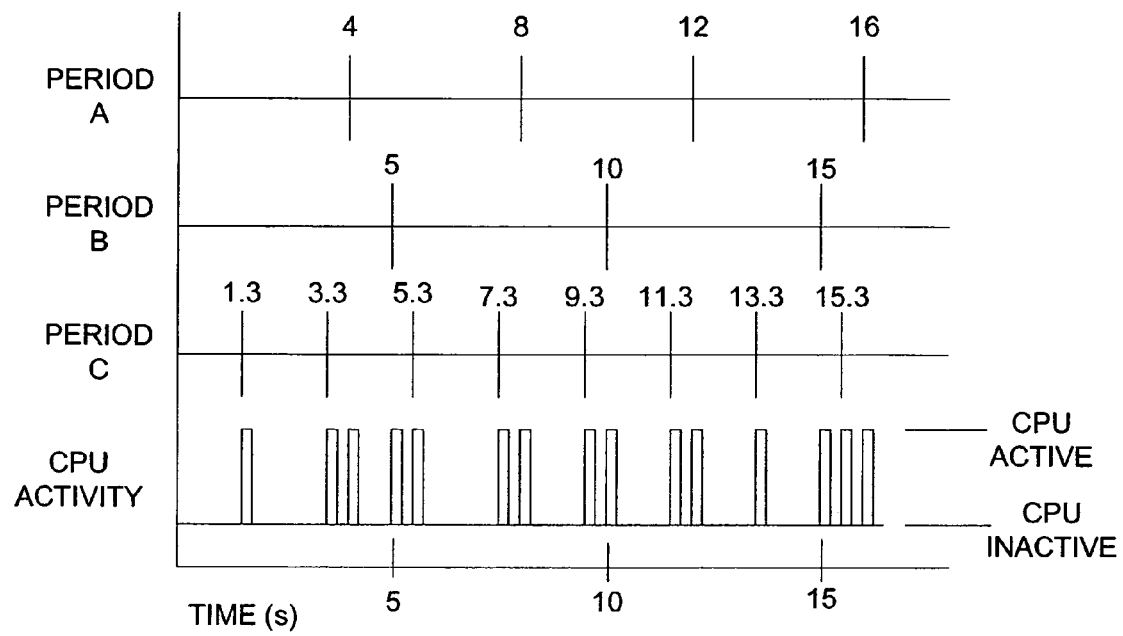
FIG. 5a shows timing graphs depicting processor usage in a prior art system.
Figure 5B:
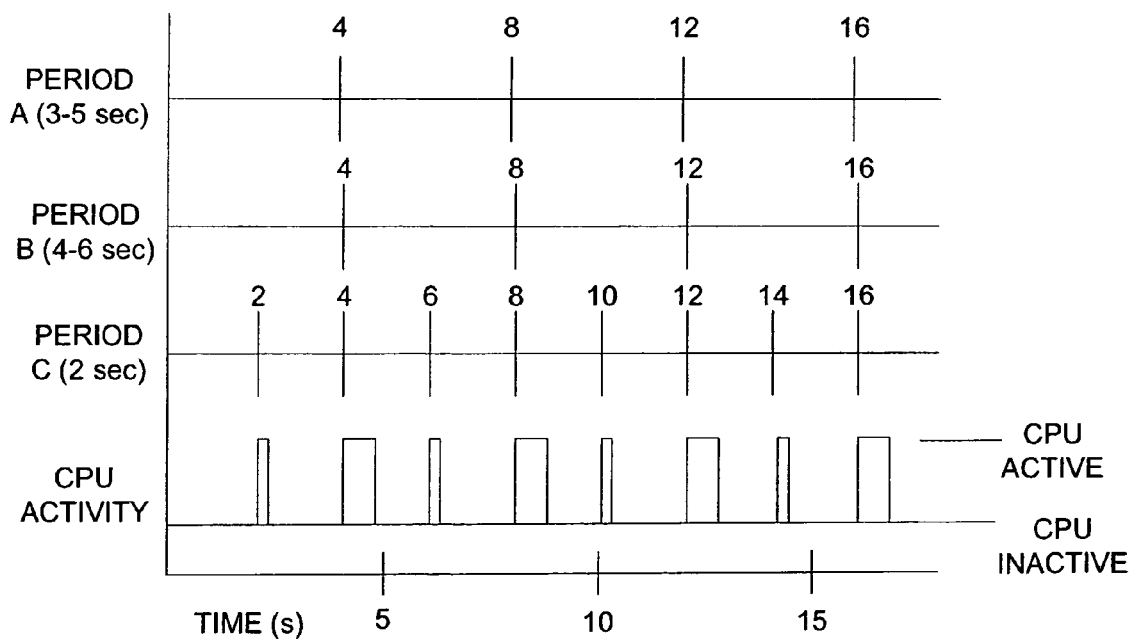
FIG. 5b shows timing graphs depicting processor usage upon implementing one embodiment of the present invention.

As discussed above, FIG. 5a depicts a timing diagram showing the processor usage of process monitoring systems without using aspects of the present invention. In FIG. 5a, the wake/sleep schedule for the process monitor is unpredictable, erratic, and results in a large number of wakes and sleeps to handle the various scheduled processes. Using one or more aspects of the present invention, however, processor use achieves increased efficiency, as shown in FIG. 5b. In FIG. 5b, the various critical processes have provided time ranges for their periods, allowing the CPM to manage the various wake/sleep and ping/response schedules for the critical processes to maximize efficiency. As a result, the process monitoring may be scheduled to occur in more distinct, consolidated, wake times, and the process monitoring process itself may be permitted to render itself inactive for longer periods of time. These longer periods of time decrease the amount of power necessary to operate the underlying device, and as such, the use life of a device may be advantageously increased.

The discussion above provides example aspects and embodiments of the present invention, but the invention is not limited to the particular configurations disclosed. Rather, the disclosed embodiments are merely example embodiments. Those skilled in the relevant arts will readily appreciate the fact that many variations to the disclosed embodiments may be made without departing from the spirit and scope of the present invention. For example, one or more of the disclosed aspects or embodiments may be combined with one or more other aspects or embodiments.

We claim as our invention:

1. A computer-readable storage medium which stores a set of computer-readable instructions which when executed perform a method for periodic process synchronization, the method executed by the set of computer-readable instructions comprising:

storing, in a memory, a schedule list comprising a plurality of time entries indicating a maximum amount of times at which a plurality of critical processes are to be checked and a minimum amount of times at which the plurality of critical processes are to be checked to determine whether said plurality of critical processes remain active, wherein the schedule list comprises a last time entry in said schedule list including a time value that is a common multiple of a plurality of periods associated with said plurality of critical processes, and wherein the plurality of critical processes specify the plurality of time entries including wildcard values for time entry registry into the schedule list;

registering at least one new critical process to be checked;

synchronizing the at least one new critical process with the schedule list, wherein synchronizing the at least one new critical process comprises:

determining whether a period associated with the at least one new critical process comprises a multiple of the time value of the last time entry of the schedule list, and in response to determining that a period associated with the at least one new critical process does not comprise a multiple of the time value of the last time entry of the schedule list, extending the schedule list to a new last time entry comprising a new time value that is a common multiple of the plurality of periods associated with said plurality of critical processes and the period associated with the at least one new critical process;

when the maximum amount of times at which a first one of the plurality of critical processes is to be checked and the minimum amount of times at which the first one of the plurality of critical processes is to be checked do not comprise a wildcard value, using said schedule list to periodically verify that said first one of the plurality of critical processes remains active within the maximum and the minimum amount of times indicated by the plurality of time entries;

when both the maximum amount of times at which a second one of the plurality of critical processes is to be checked and the minimum amount of times at which the second one of the plurality of critical processes is to be checked comprise the wildcard value, the wildcard value being expressed as a zero time value and indicating an open end of a time range, using said schedule list to periodically verify that said second one of the plurality of critical processes remains active during a periodic verification of each of the plurality of critical processes; and taking corrective action when at least one of said plurality of critical processes no longer remains active.

2. The computer-readable storage medium of claim 1, further comprising:

sending a first signal to a first critical process at a first time in said schedule list;

waiting for a second time in said schedule list, wherein said second time corresponds to said first critical process;

at said second time, determining whether a response to said first signal was received from said first critical process;

resending said first signal to said first critical process if said response was received; and taking corrective action if said response was not received from said first critical process.

3. The computer-readable storage medium of claim 2, wherein taking corrective action if said response was not received from said first critical process comprises taking corrective action by restarting said first critical process.

4. The computer-readable storage medium of claim 1, wherein said schedule list further comprises information identifying at least one of said plurality of critical processes.

5. The computer-readable storage medium of claim 1, wherein said computer-readable storage medium is enclosed within a portable computing device.

6. The computer-readable storage medium of claim 5, wherein said portable computing device is one of a cellular telephone and a pager.

7. The computer readable storage medium of claim 1, wherein a wildcard time entry in the schedule list adjusts the plurality of critical processes' periodic event frequency.

8. A computing device for periodic process synchronization, the computing device comprising:

a memory storage; and a processing unit coupled to the memory storage, wherein the processing unit is operative to:

provide a schedule list having entries of time information and event identification information associated with a plurality of processes, wherein the schedule list comprises a plurality of time entries indicating a maximum amount of times at which said plurality of processes are to be checked and a minimum amount of times at which said plurality of processes are to be checked to determine whether said plurality of processes remain active, and wherein the schedule list comprises a last time entry in the schedule list including a time value that is a common multiple of a plurality of periods associated with said plurality of processes, the plurality of processes being operative to specify a plurality of time entries including wildcard values for time entry registry into the schedule list;

register at least one new process;

synchronize the at least one new process with said schedule list, wherein being operative to synchronize the at least one new process comprises being operative to:

determine whether a period associated with the at least one new process comprises a multiple of the time value of the last time entry of the schedule list, and in response to determining that a period associated with the at least one new process does not comprise a multiple of the time value of the last time entry of the schedule list, extending the schedule list to a new last time entry comprising a new time value that is a common multiple of the plurality of periods associated with said plurality of processes and the period associated with the at least one new process;

when the maximum amount of times at which a first one of the plurality of processes is to be checked and the minimum amount of times at which the first one of the plurality of processes is to be checked do not comprise a wildcard value, use said schedule list to periodically verify that said first one of the plurality of processes remains active within the maximum and the minimum amount of times indicated by the plurality of time entries;

when both the maximum amount of times at which a second one of the plurality of processes is to be checked and the minimum amount of times at which the second one of the plurality of processes is to be checked comprise the wildcard value, the wildcard value being expressed as a zero time value and indicating an open end of a time range, use said schedule list to periodically verify that said second one of the plurality of processes remains active during a periodic verification of each of the plurality of processes; and take corrective action when at least one of said plurality of processes no longer remains active.

9. The device of claim 8, wherein a first one of said processes is a critical process monitor, and at least one of said plurality of processes includes a critical process.

10. The device of claim 8, wherein said memory storage comprises a single memory storage unit.

11. The device of claim 8, wherein said processing unit is a single processor.

12. The device of claim 8, wherein the schedule list includes a wildcard time entry which adjusts the plurality of processes' periodic event frequency.

13. A computer-readable storage medium which stores a set of computer-readable instructions which when executed perform a method for periodic process synchronization, the method executed by the set of computer-readable instructions comprising:

storing, in a memory, a schedule list having a plurality of time entries indicating a maximum amount of times at which a plurality of critical processes are to be checked, a minimum amount of times at which the plurality of critical processes are to be checked to determine whether the plurality of critical processes remain active, and a last time entry including a time value that is a common multiple of a plurality of periods associated with said plurality of time entries, and wherein the plurality of critical processes specify the plurality of time entries including wildcard values for time entry registry into the schedule list;

registering at least one new critical process to be checked;

synchronizing the at least one new critical process with the schedule list, wherein synchronizing the at least one new critical process comprises:

determining whether a period associated with the at least one new critical process comprises a multiple of the time value of the last time entry of the schedule list, and in response to determining that a period associated with the at least one new critical process does not comprise a multiple of the time value of the last time entry of the schedule list, extending the schedule list to a new last time entry comprising a new time value that is a common multiple of the plurality of periods associated with said plurality of critical processes and the period associated with the at least one new critical process;

when both the maximum amount of times at which a first one of the plurality of critical processes is to be checked and the minimum amount of times at which the first one of the plurality of critical processes is to be checked comprise the wildcard value, expressed as a zero time value and indicating an open end of a time range, using said schedule list to periodically verify that said first one of the plurality of critical processes remains active during a periodic verification of each of the plurality of critical processes; and when the maximum amount of times at which a second one of the plurality of critical processes is to be checked and the minimum amount of times at which the second one of the plurality of critical processes is to be checked do not comprise a wildcard value, using said schedule list to periodically verify that said second one of the plurality of critical processes remains active, wherein using the schedule further comprises;

sending a first signal to a first critical process at a first time in the schedule list, waiting for a second time in the schedule list, wherein the second time corresponds to the first critical process, at the second time, determining whether a response to the first signal was received from the first critical process, resending the first signal to the first critical process if the response was received, and taking corrective action if the response was not received from the first critical process.

* * * * *